United States Patent [19]
Papadopoulos

[11] 3,872,579
[45] Mar. 25, 1975

[54] METHOD OF MAKING ELECTROLYTIC CAPACITORS
[75] Inventor: George S. Papadopoulos, Sanford, N.C.
[73] Assignee: Cornell-Dubilier Electric Corporation, Newark, N.J.
[22] Filed: Apr. 11, 1973
[21] Appl. No.: 350,001

[52] U.S. Cl. .................................. 29/570, 252/62.2
[51] Int. Cl. ............................................. H01g 13/04
[58] Field of Search ...................... 29/570; 252/62.2

[56] References Cited
UNITED STATES PATENTS
3,138,746  6/1964  Burger et al. ...................... 252/62.2
3,622,843  11/1971  Vermilyea et al. ................... 29/570
3,696,037  10/1972  Lagercrantz et al. ............... 252/62.2
3,719,602  3/1973  Anderson et al. .................. 252/62.2

Primary Examiner—Roy Lake
Assistant Examiner—Craig R. Feinberg
Attorney, Agent, or Firm—Paul S. Martin; George L. Kensinger

[57] ABSTRACT

Electrolytic capacitors, especially those using aluminum as the film-forming anode, include an electrolyte resulting from the reaction of an acid of a film-forming anion and an organic solvent during the heat-aging of such capacitors.

4 Claims, No Drawings

METHOD OF MAKING ELECTROLYTIC CAPACITORS

The present invention relates to electrolytic capacitors and their method of manufacture.

BACKGROUND OF THE INVENTION

Electrolytic capacitors commonly comprise an oxide-coated electrode of a film-forming metal such as aluminum, tantalum and niobium and a companion electrode, with a porous insulating separator and an electrolyte between the electrodes. Various organic solvents have been proposed, especially for attaining a wide temperature range of operation. Dimethylformamide has proved to be an eminently suitable solvent, in its availability at low cost and in its properties in capacitor electrolytes. Various salts have been found suitable. Without limiting the combination of ions to those available as salts, a wider choice of ionogens is realized by mixing an acid of a film-forming anion with dimethylformamide and adding reagent to provide a desirable cation, in an amount determined by the desired pH, generally in the range 5 – 9 but commonly between 5.5 and 6.5. It has also been proposed (U.S. Pat. No. 3,138,746 — Burger) that dimethylformamide and a film-forming acid (without a cation-contributing reagent) should be refluxed to yield a self-buffered electrolyte for capacitors. Refluxing introduces the danger of contamination and it entails a distinct added manufacturing step and relatively costly equipment.

SUMMARY OF THE INVENTION

Electrolytic capacitors pursuant to this invention are manufactured without resort to particular salts as ionogens in dimethylformamide and without resort to a refluxing treatment for the electrolyte. It has been discovered that when an acid of a film-forming anion is mixed into dimethylformamide, its pH is typically very low, 2.5 for example, and the resistivity of the electrolyte is normally far too high. Nevertheless, if capacitors are asembled, impregnated with such an electrolyte, sealed and then subjected to a routine burning-in or aging treatment with the capacitor maintained at a high temperature such as 125°C and with forming potential applied to its electrodes, the result is an excellent capacitor in operating characteristics, and one that is stable in storage. The dissipation factor and the equivalent series resistance of the resulting capacitors are excellent, demonstrating that the resistivity of the electrolyte changed radically in the aging process. It is assumed that the aging process causes the acid to react with some small amount of the solvent dimethylformamide. Moreover, there is no evidence of any abnormal pressure build-up in the sealed capacitor during aging, and stability of the electrical characteristics of the resulting capacitors during prolonged shelf-life proves that reaction products that develop during the aging process are not harmful. In the text that follows, the common designation "DMF" signifies dimethylformamide.

More specifically, the following formulas are useful as examples of starting electrolytes in impregnating an assembly of all the parts of aluminum electrolytic capacitors:

Example No. 1: 300 ml DMF and 24 gm maleic acid
Example No. 2: 300 ml DMF and 24 gm citric acid
Example No. 3: 300 ml DMF and 24 gm phthalic acid
Example No. 4: 200 ml DMF and 4 gm boric acid
Example No. 5: 190 ml DMF, 10 ml $H_2O$ and 4 gm boric acid
Example No. 6: 20 ml DMF, 180 ml $H_2O$ and 4 gm boric acid As prepared, the solutions of Examples 1–4 have resistivities of 30,000 to 97,000 ohm-centimeters, and the pH of these solutions is in the range 2.5 to 4.8 whereas DMF electrolytes for commercial capacitors as prepared typically have a resistivity of the order of 500 to 2000 ohm-centimeters and a pH of approximately 6.5.

The Examples No. 5 and No. 6 above are illustrative of a series of other examples showing the feasibility of including water in any proportion with DMF, it being understood that inclusion of a large percentage of water detracts from high-and-low-temperature performance of the capacitors utilizing such electrolytes.

A range of other known film-forming anions in addition to those in the above examples include the acetate ion, arsenate ion, phosphate ion, picramate ion, propionate ion, tartrate ion and vanadate ion, so that acids of these ions may be used with DMF as an impregnant for electrolytic capacitors, to be rendered operative by aging after impregnation.

The proportions of acid and solvent of or including DMF are not critical, the acid ranging approximately from 0.1 to 15% by weight of the DMF.

As applied to wound electrolytic capacitors using aluminum, tantalum or zirconium foils, the preparatory manufacturing steps are wholly conventional. The electrode foils are prepared by electrochemically forming one foil with an oxide coating, or both foils are formed with an oxide coating in the case of non-polarized units intended for alternating current use. Terminal leads are joined to cut lengths of the electrode foils which are then wound with porous insulating spacers. The resulting so-called wound section is inserted into a container having a cover at one end or covers at opposite ends, the terminal leads extending through suitable seals in the end cover(s). This constitutes a mechanical assembly of the components of a typical wound-section electrolytic capacitor, ready for impregnation, typified by the construction in U.S. Pat. Nos. 3,555,370 and 3,681,666 issued to E. L. Bowling and assigned to the assignee hereof.

In this condition the assembly has an opening at one or more places. It is conventionally subjected to vacuum treatment at a raised temperature to remove the gas and moisture. Then the electrolyte is introduced, and the unit is sealed.

In this condition the capacitor has extremely poor characteristics and may even be virtually inoperative for practical purposes when impregnated with electrolytes in the examples above. Conventional capacitors of this type also need heat-aging after impregnation to upgrade their characteristics. Prior to heat-aging the electrical characteristics of capacitors of the present invention are radically poorer than those of electrolytic capacitors made with comparable conventional electrolytes. The heat-aging process alone is effective to convert the very poor-looking initial characteristics to at least equal the characteristics of other capacitors using DMF electrolytes made with a salt or with reagents combined to impart usual values of pH and resistivity as indicated above. It is found that reaction products developed in the course of aging do not have a harmful effect on the aged capacitor's electrical characteristics after prolonged shelf-life following the aging treatment.

Capacitors have been made using aluminum-foil electrodes, prepared as a mechanical assembly described above, impregnated with a solution of DMF and the acid of a film-forming anion and sealed. The physical assembly at this stage involves cut and bare edges of the foil electrodes and other areas of the anode and the anode lead where the anode oxide coating is damaged or is missing. The impregnated assembly was subject to room-temperature burn-in or aging for mending the anode oxide coating, to arrive at an "initial" condition. Then heat-aging was carried out by maintaining the capacitors at 125°C and applying direct-current forming potential to the terminals. Both during room-temperature burn-in or aging and during heat-aging, the potential is low at the start, and it is gradually increased as the flow of leakage-current diminishes. The forming voltage is ultimately increased to approximately 10% above the capacitor rating.

Example No. 7: 100 ml DMF, 4 gm boric acid and 4 gm citric acid as an electrolyte was used to impregnate three capacitor assemblies designed as 45 mfd capacitors rated at 50 volts d.c.

The initial data was:

| UNIT No. | d.c.l. | Cap. | D.F. | ESR |
|---|---|---|---|---|
| 1 | 2.8 | 46.0 | 18.2 | 5.4 |
| 2 | 2.2 | 51.0 | 18.6 | 5.0 |
| 3 | 2.2 | 51.0 | 16.3 | 4.4 |

In the table, "d.c.l." means direct-current leakage in microamperes; "Cap." means capacitance in microfarads; "D.F." means dissipation factor as a percentage; and ESR means effective series resistance in ohms.

After heat-aging for 100 hours, the data was:

| UNIT No. | d.c.l. | Cap. | D.F. | ESR |
|---|---|---|---|---|
| 1 | 0.2 | 45.5 | 4.7 | 1.4 |
| 2 | 0.2 | 50.5 | 4.6 | 1.2 |
| 3 | 0.2 | 49.5 | 4.4 | 1.2 |

Example No. 8: 100 ml. DMF, 4 gm boric acid and 8 gm phthalic acid as an electrolyte was used to impregnate three capacitor assemblies designed as 560 MFD capacitors rated at 15 volts d.c.

The initial data was:

| UNIT No. | d.c.l. | Cap. | D.F. | ESR |
|---|---|---|---|---|
| 1 | 5.5 | 254 | 490 | 27 |
| 2 | 3.7 | 300 | 500 | 21 |
| 3 | 4.0 | 291 | 590 | 26 |

The data after heat-aging for 100 hours was:

| UNIT No. | d.c.l. | Cap. | D.F. | ESR |
|---|---|---|---|---|
| 1 | 2.0 | 615 | 22.1 | .49 |
| 2 | 0.5 | 545 | 17.5 | .44 |
| 3 | 0.4 | 568 | 18.5 | .44 |

After heat-aging for 500 hours, the data was:

| UNIT No. | d.c.l. | Cap. | D.F. | ESR |
|---|---|---|---|---|
| 1 | 1.2 | 602 | 11.5 | 0.26 |
| 2 | 0.5 | 525 | 9.1 | 0.23 |
| 3 | 0.6 | 548 | 9.6 | 0.24 |

It may be noted that, for similar commercial capacitors of this low-voltage rating, a dissipation factor of 20% is considered satisfactory.

Example No. 9: 300 ml DMF and 24 gm phthalic acid.

This solution was used in two different ways. In one procedure, it was heated overnight at 125°C in a sealed inert contamination-free container. Its initial resistivity changed from 30,000 to 1,130 ohm-centimeters and its pH changed from 3.7 to 5.3. It was then used to impregnate capacitor assemblies which were then sealed and heat-aged. Heating many other acids of film-forming anions in solution in DMF in a sealed inert and clean container had like effects on the resistivities of the solutions and on the pH's and they were useful in producing excellent capacitors.

In another procedure, the electrolyte of Example No. 9 was mixed and used without the above heat treatment to impregnate two capacitors assemblies designed to yield capacitors rated at 280 mfd at 100 volts d.c.

The initial data was:

| UNIT No. | d.c.l. | Cap. | D.F. | ESR |
|---|---|---|---|---|
| 1 | 80 | 282 | 22.0 | 1.05 |
| 2 | 100 | 273 | 22.6 | 1.16 |

After heat-aging for 100 hours:

| UNIT No. | d.c.l. | Cap. | D.F. | ESR |
|---|---|---|---|---|
| 1 | 16 | 243 | 2.2 | 0.122 |
| 2 | 25 | 228 | 2.5 | 0.147 |

In each of Examples 7, 8 and 9 there is a pronounced improvement in characteristics following the heat-aging treatment, ending with excellent values. Most dramatic is Example 8, where the dissipation factor of the units in the test was approximately 500% before heat-aging and dropped to approximately 10% after 500 hours, the latter being vastly better than the 20% value regarded as satisfactory for that rating. Example No. 8 shows that capacitors manufactured in accordance with the present invention may be expected to improve in use. This is so because the capacitors in use are subjected to forming voltage and their inherent loss develops internal heat, thus simulating an extension of the heat-aging period.

Presently preferred solutions of DMF and boric acid, alone and with other acids of film-forming anions for present purposes are as follows:

To 100 ml DMF and 4 gm boric acid, add any of the following: 0.5 gm citric acid, 4 gm citric acid, 2 gm maleic acid, or 8 gm phthalic acid. A further preferred solution consists of 1 gram of boric acid in 100 milliliters of DMF.

It is apparent from the above that capacitors made in accordance with the given examples are illustrative and wide departures may be made in the given constituents and concentrations of the solutions; and the aging conditions are of course illustrative. Therefore the invention should be construed broadly in accordance with its true spirit and scope.

What is claimed is:

1. A method of manufacturing electrolytic capacitors including the steps of assembling a capacitor structure including separated electrodes at least one of which is an oxide-coated film-forming electrode into a container for electrodes to constitute a capacitor assembly, impregnating the capacitor structure with a solution including dimethylformamide as at least part of the solvent thereof and ionogen providing material consisting of a number of acids of film-forming anions as the ionogen of the solution where said number is at least one, sealing the container, and subjecting said sealed capacitor assembly to heat-aging for reducing prominently the direct-current leakage, the dissipation factor and effective series resistance thereof, the method further including the step of electrically aging the capacitor assembly after impregnation but before the heat-aging step.

2. A method of manufacturing capacitors in accordance with claim 1, wherein the electrodes are of aluminum foil and the acid is at least one of the group consisting of boric acid, phthalic acid, maleic acid and citric acid.

3. A method of manufacturing capacitors in accordance with claim 1, wherein the electrodes are of aluminum foil and the acid is boric acid in combination with one of the group consisting of phthalic acid, maleic acid and citric acid.

4. A method of manufacturing electrolytic capacitors including the steps of assembling a capacitor structure including separated electrodes at least one of which is an oxide-coated film-forming electrode into a container for such electrodes to constitute a capacitor assembly, impregnating the capacitor structure with a solution including dimethylformamide as at least part of the solvent thereof and ionogen providing material consisting of a number of acids of film-forming anions as the ionogen thereof where said number is at least one, said solution having a resistivity in the range of about 30,000 to 97,000 ohm-centimeters and a pH of about 2.5 to 4.8, sealing the container enclosing the impregnated capacitor structure, subjecting said sealed capacitor assembly to heat-aging for reducing prominently the resistivity and raising the pH of the electrolyte, and subjecting the impregnated capacitor assembly to electrical aging prior to the heat-aging step.

* * * * *